United States Patent
Haustein et al.

(10) Patent No.: US 9,747,168 B2
(45) Date of Patent: Aug. 29, 2017

(54) DATA BLOCK BASED BACKUP

(71) Applicant: International Business Machines Corporation, Armonk, NY (US)

(72) Inventors: Nils Haustein, Soergenloch (DE); Dominic Mueller-Wicke, Weilburg (DE); Thomas Prause, Rottenburg (DE); Sabine U. Steinhauer, Ingelheim (DE); Andreas Uhl, Gäufelden (DE)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 14/843,010

(22) Filed: Sep. 2, 2015

(65) Prior Publication Data
US 2016/0110258 A1  Apr. 21, 2016

(30) Foreign Application Priority Data
Oct. 15, 2014 (GB) .................................. 1418219.0

(51) Int. Cl.
*G06F 11/00* (2006.01)
*G06F 11/14* (2006.01)
*G06F 17/30* (2006.01)

(52) U.S. Cl.
CPC ...... *G06F 11/1451* (2013.01); *G06F 11/1469* (2013.01); *G06F 17/30* (2013.01); *G06F 2201/80* (2013.01); *G06F 2201/84* (2013.01)

(58) Field of Classification Search
CPC ............. G06F 11/1451; G06F 11/1469; G06F 11/0709; G06F 11/1448; G06F 11/1458; G06F 17/30; G06F 2201/80; G06F 2201/84

USPC .................................... 714/18, 4.11, 6.3, 42
See application file for complete search history.

(56) References Cited

U.S. PATENT DOCUMENTS

| | | | |
|---|---|---|---|
| 7,809,868 B1 | 10/2010 | Mu | |
| 8,176,272 B2 * | 5/2012 | Augenstein | G06F 11/1451 707/639 |
| 8,375,181 B1 * | 2/2013 | Kekre | G06F 3/061 711/162 |

(Continued)

OTHER PUBLICATIONS

Haustein et al., "A data block based backup method," Application and Drawings, Filed on Oct. 15, 2014, p. 1-49, GB Patent Application Serial No. GB1418219.0.

(Continued)

*Primary Examiner* — Joseph D Manoskey
(74) *Attorney, Agent, or Firm* — Robert C. Bunker

(57) ABSTRACT

The present invention relates to a data block based backup method for a data management system. The data management system comprises a file system that controls access by a database application to at least one database container file stored the data management system. The data management system further comprises a backup client that is connected to a remote backup server, whereby a first version of the database container file is saved in the backup server and a first inode containing information on data blocks of the first version of the database container file. The method may include creating a change tracking table for at least the database container file and adding an entry in the change tracking table, whereby the entry has an indication of the respective data block in association with an information indicating the type of the access.

20 Claims, 8 Drawing Sheets

(56) References Cited

U.S. PATENT DOCUMENTS

| | | | |
|---|---|---|---|
| 8,621,165 B1 | 12/2013 | Sridharan et al. | |
| 8,639,665 B2 | 1/2014 | Berman et al. | |
| 2005/0028026 A1* | 2/2005 | Shirley | G06F 11/1469 714/6.3 |
| 2005/0144202 A1 | 6/2005 | Chen | |
| 2007/0260833 A1 | 11/2007 | Nagata et al. | |
| 2010/0145909 A1* | 6/2010 | Ngo | G06F 11/1471 707/611 |
| 2012/0054156 A1 | 3/2012 | Mason, Jr. et al. | |
| 2013/0111262 A1* | 5/2013 | Taylor | G06F 11/2005 714/4.11 |
| 2014/0074790 A1 | 3/2014 | Berman et al. | |
| 2014/0337664 A1* | 11/2014 | Gokhale | G06F 11/1464 714/6.3 |
| 2015/0254150 A1* | 9/2015 | Gordon | G06F 11/1662 714/6.3 |

OTHER PUBLICATIONS

UK Intellectual Property Office, "Search Report under Section 17," Apr. 9, 2015, 7 Pages, International Application No. GB1418219.0.

\* cited by examiner

DATA BLOCK BASED BACKUP

BACKGROUND

The invention relates to computing systems, and more particularly to a data block based backup method.

The significant growth of data confronts computing systems with new challenging situations in terms of data protection. In extremely large storage systems data is not just stored to have it available for seldom future usage. Analytics, stream computing and data warehousing require immediate access to all the data stored in such a system in different manners. To achieve these goals large scaling distributed file systems are implemented to provide both extremely large file systems on the one hand and maximum compute power on the other hand. Especially in the area of large databases that exist of extremely large files hosting the database containers backup and restore faces systems with new problems.

SUMMARY

It is an objective of embodiments of the invention to provide for a data block based backup method, a backup client, and a computer program product. Said objective is solved by the subject matter of the independent claims. Advantageous embodiments are described in the dependent claims.

In one aspect, the invention relates to a data block based backup method for a data management system, the data management system comprising a file system that controls access by a database application to a database container file stored in a first storage of the data management system, the data management system further comprising a backup client that is connected to a remote backup server in a client-server configuration, whereby a first version of the database container file is saved in the backup server and a first inode comprising information on data blocks of the first version of the database container file. The method may include creating a change tracking table for at least the database container file, and repeatedly adding an entry in the change tracking table in response to detecting an access of the database application to a data block of the database container file, wherein the entry comprises an indication of the respective data block in association with an information indicating the type of the access, wherein the type of the access comprises at least one of a read and a write access. The method may also include responding to receiving a request to backup the database container file. The method may then include pausing the execution of the database application. The method may further include performing a snapshot of a storage volume containing at least the file system and the database container file in a second storage of the data management system. The method may also include resuming the database application. The method may then include mounting the snapshot storage volume. The method may further include recreating the file system including a copy of the database container file in the second storage device using the mounted storage volume. The method may also include identifying entries in the change tracking table referencing the database container file and that are associated with information indicating a write access. The method may then include copying the data associated with data blocks of the identified entries to the backup server from the copy of the database container file, thereby backing up a second version of the database container file. The method may further include updating the first inode for indicating the backed up data blocks in the backup server, thereby obtaining a second inode.

In another aspect, the invention relates to a computer program product comprising a non-transitory computer readable storage medium having computer readable program code embodied therewith, said program code being executable by a computer to perform the method steps of the method of any one of the preceding embodiments.

In another aspect, the invention relates to a backup client for a data management system, the data management system comprising a file system that controls access by a database application to at least one database container file stored in a first storage of the data management system, wherein a first version of the database container file is saved in a backup server remotely connected to the data management system, wherein a first inode comprises information on data blocks of the first version of the database container file. The backup client is configured to perform a method. The method may include creating a change tracking table for at least the database container file, and repeatedly adding an entry in the change tracking table in response to detecting an access of the database application to a data block of the database container file, wherein the entry comprises an indication of the respective data block in association with an information indicating the type of the access, wherein the type of the access comprises at least one of a read and a write access. The method may also include in response to receiving a request to backup the database container file. The method may then include pausing the execution of the database application. The method may further include performing a snapshot of a storage volume containing at least the file system and the database container file in a second storage of the data management system. The method may also include starting the database application. The method may then include mounting the snapshot storage volume. The method may further include recreating the file system including a copy of the database container file in the second storage. The method may also include identifying entries in the change tracking table referencing the database container file and that are associated with information indicating a write access. The method may then include copying the data associated with data blocks of the identified entries to the backup server from the copy of the database container file, thereby backing up a second version of the database container file. The method may further include updating the first inode for indicating the backed up data blocks in the backup server, thereby obtaining a second inode.

BRIEF DESCRIPTION OF THE SEVERAL VIEWS OF THE DRAWINGS

In the following, preferred embodiments of the invention will be described in greater detail by way of example only making reference to the drawings in which.

DETAILED DESCRIPTION

Figure 1:
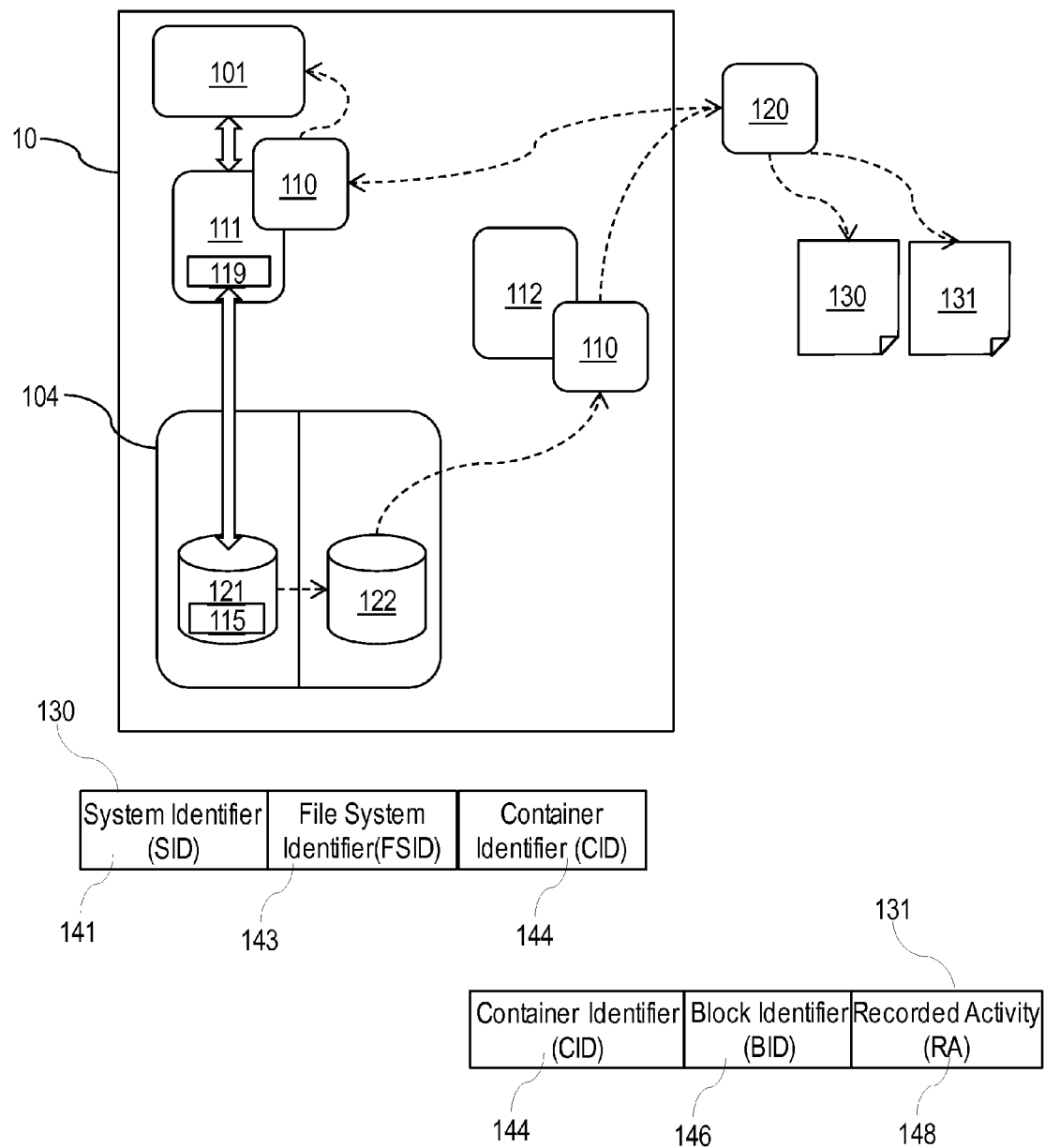
FIG. 1 illustrates an exemplary computer system for data block based backup.

In the following, like numbered elements in the figures either designate similar elements or designate elements that perform an equivalent function. Elements which have been discussed previously will not necessarily be discussed in later figures if the function is equivalent.

The backup and restore of database container files may be performed in an atom manner to ensure the consistency of the database. However, the restore of such extremely large files causes unacceptable system outages as the whole database container file must be copied back to the production system in one atom step and the production can't access the database container file while restoring.

Subject of the present disclosure teaches a system and method which determines and implements an improved backup and restores method for database container files managed or controlled by a file system. With the present invention, the problem that the database application has to wait for the full file restore and the resulting production time out is solved in that at least part of the database container files is restored on demand.

As an example, the DMAPI implementation of the file system type may be configured so as to track changes and generate access statistics for the database container file. Based on these information an optimized backup method may be implemented. Furthermore, the information may be used in combination with a DMAPI based restore mechanism to implement an optimized and non-time consuming restore method for single database container files or a disaster recovery of the whole file system that allows immediate production on the database container file. The present restore method works on metadata and does not require a full restore of the database before starting production as known to prior art.

The file system of the data management system may be a clustered file system where the first and second storages are placed in a pair (I/O group) for redundancy, which provide a single management interface.

The term "inode" as used herein refers to a data structure used to represent a file system object such as the database container file, which can be one of various components including a file or a directory. For example, an inode stores the attributes and disk block location(s) of the file system object's data.

The term "data block" or "extent" as used herein refers to a sequence of bytes or bits, usually containing some whole number of records, having a maximum length, a block size.

The term "snapshot" as used herein refers to an image backup type that consists of a point-in-time view of a storage volume.

A client-server configuration is a system where one or more computers called clients connect to a central computer named a server to use resources such as storage and/or processing resources i.e. the server is used to "serve" client computers.

As used herein, the term "node" or "compute node" refers to a communication entity such as a processor, a computer (for instance a client computer), which can be operated within a communication network (such as the public Internet, an intranet, a telecommunication network, etc., or a combination of such networks). A node may have processing and storage capability for fulfilling assigned tasks in the framework of the data processing system.

The pausing (or interrupting) step comprises storing information indicative of a state of the execution unit (that runs the database application) of the data management system at a time of the pausing or suspending. The resuming or restarting comprises restoring the state of the execution unit stored based on the information stored.

The first and second inodes may be separate inodes or may be part of a combined inode. The combined inode comprises the content of the first and second inodes.

The information indicating a write access in the change tracking table may further indicate the version of the database container file that is accessed for write.

The above features may have the advantage of performing an efficient data backup of database container files with a data traffic reduced to a minimum. This is in contrast to conventional methods where the backup requires a transmission of the full data to be backed up.

According to one embodiment, the method further comprises generating a metadata image of the file system including information on the database container file; sending the metadata image to the backup server. This may enable restoring the database container file after a partial or complete site failure that was caused by a catastrophic event such as an earthquake or fire.

According to one embodiment, the method further comprises detecting a disaster event in the data management system; pausing the database application; retrieving the metadata image of the file system and the second inode from the backup server; recreating the file system and an empty database container file using the metadata image; resuming the database application, wherein in case of a read access by the database application to a given data block of the database container file, retrieving the given data block from the backup server using the second inode. In case the second inode is stored locally in the data management system, there may be no need to retrieve the second inode. In this way the database application may start without waiting for the full database container file to be locally loaded. This is especially advantageous when the database application is accessing only small part of the database container file. This may prevent transferring data that may not be used and thus save bandwidth resources.

The disaster event may comprise a partial or complete failure in the data management system that was caused by a catastrophic event such as an earthquake or fire.

According to one embodiment, the method further comprises detecting a disaster event in the data management system, wherein the disaster event induces an interruption of the execution of the database application; retrieving the change tracking table, the metadata image of the file system and the second inode from the backup server; recreating the file system and an empty database container file using the metadata image; retrieving data blocks associated with entries having a write or read access type of the database container file in the change tracking table; restarting the database application, wherein in case of a read access by the database application to a non-retrieved data block of the database container file, retrieving that data block from the backup server using the second inode. This embodiment may improve the uninterrupted read of the database application of the likely used data blocks which are the data blocks associated with read or write access in the change tracking table.

According to one embodiment, the method further comprises detecting a disaster event in the data management system; pausing the database application; retrieving the change tracking table, the metadata image of the file system and the second inode from the backup server; recreating the file system and an empty database container file using the metadata image; retrieving data blocks associated with entries having a write or read access type of the database container file in the change tracking table; restarting or resuming the database application, wherein in case of a read access by the database application to a non-retrieved data block of the database container file, retrieving that data block from the backup server using the second inode.

According to one embodiment, the method further comprises receiving a request to restore the second version of the first database file container; upon detecting a read access of the data base application to a data block of the current version of the database container file, using the second inode for retrieving the data block from the backup server. This may have the advantage of providing an on-demand restore of data which may then avoid retrieving data that may not be used.

According to one embodiment, the method further comprises receiving a request to restore the second version of the first database file container; retrieving the change tracking table from the backup server; identifying entries of the change tracking table associated with a write access and entries associated with a read access in case the second version is not the last version; using the second inode for retrieving the data blocks associated with the identified entries; upon detecting a read access of the database application to a non-retrieved data block of the current version of the database container file, using the second inode for retrieving that data block from the backup server.

The identification of the read accessed entries in case the second version is not the last version may not be needed if the entries associated with a write access in the change tracking table are not updated when they are subsequently accessed for read. For example, an entry in the change tracking table has at time t1 value W indicating that associated data block is accessed for writing. If at time t2 after t1 the associated data block is accessed for reading the value W does not change e.g. to R.

In contrast to the pure on-demand retrieval, this embodiment may have the advantage of transferring the data that is most likely to be used by the database application (since it was accessed before) at once which may save resources compared to multiple retrievals.

According to one embodiment, an entry of the change tracking table having information indicating a write or read access is updated only if the corresponding data block is accessed for writing. This may have the advantage that the information according to which a data block has been changed is not lost because the changed data block has been subsequently accessed for read. This may provide an accurate backup and restore operations.

According to one embodiment, the file system is a general parallel file system (GPFS) and the GPFS is data management API, DMAPI, enabled, wherein the database container file is set with a DMAPI event mask.

The DMAPI may support the monitoring of events on database container files that are set with DMAPI event mask (e.g. the database container file) and the management and maintenance of the data blocks in a database container file. For example, the DMAPI may be used to perform the detection of the access of the database application to a data block of the database container file. For example, DMAPI may be used to read and write data blocks that were transferred from the data management system to backup server and vice versa.

This may have the advantage of seamless integration of the present method with existing systems.

According to one embodiment, the method further comprises disabling the entries of the change tracking table that have been backed up by: deleting said entries; or changing the information to indicate a dummy value for the access type. The dummy value may comprise a value different from the read and write access. This may be advantageous for restoring the last version of a backed up database container file.

According to one embodiment, the change tracking table is stored in one of the data management system and the backup server.

FIG. 1 illustrates the components of a computer system 100. The computer system 100 comprises a data management system 10 that is connected to a backup server 120 e.g. via a network which may be a public network, such as the Internet, a private network, such as a wide area network (WAN), or a combination thereof.

Component 101 represents the file system that controls access e.g. by a database application 119 to database container files stored in a storage 121. For simplicity of the description, primary storage 121 is shown as containing a single database container file 115; however it may comprise more than one database container file. Component 111 represents the compute node or computer device that hosts the file system 101. Compute node 111 may be a single node or a compute cluster. Component 104 is the storage device that provides the physical storage for file system 101 and supports the split copy function required for hardware based snapshots. The first storage 121 is the primary storage inside component 104. Component 122 is the secondary storage inside component 104. Component 112 represents the compute node or computer device used for the offload of the backup data to the backup server 120. Compute node 112 may be a single compute node or a compute cluster. Physically compute nodes 111 and 112 may be the same compute node or on separate compute nodes (e.g. compute node 111 may be a backup node and compute node 112 may be a restore node). Component 110 represents the backup and restore client that is hosted by compute node 112. In the case 111 and 112 are different compute nodes backup and restore client 110 may be installed on both compute nodes 111 and 112. For example, backup and restore client 110 may backup data from the compute node it is running on and restore data to that compute node it is running on.

Backup server 120 hosts the backup data. It is also shown that backup server 120 may comprise a change tracking table. The change tracking table is shown in the form of two tables 130 and 131; however a skilled person having access to the present disclosure would recognize that more or less than two tables may be used to represent the change tracking table. Table 130 holds partially the appropriate information to allow the processing proposed with this disclosure. Table 131 holds partially the appropriate information to allow the processing proposed with this disclosure.

The change tracking table 130, 131 may be created by the backup server 120 upon receiving a request from the backup client 110. In another example, the change tracking table 130, 131 may be created by the backup client 110.

The change tracking table 130, 131 may be created at the time a first version or an initial version of the database container file 115 is backed up in the backup server 120. At that time, the change tracking table 130, 131 may comprise entries that correspond to all data blocks of the database container file 115. For example, if the database container file 115 comprises 3 data blocks, three entries are created in the change tracking table 130, 131.

In another example, the change tracking table 130, 131 may be created at the first time the database container file 115 is accessed after the first version of the database container file 115 is saved in the backup server 120.

As shown in FIG. 1, table 130 holds the following information in different columns:

A unique identifier (SID) 141 for the computer system or compute node that hosts the file system that controls access or manages the data base container file to be protected.

A unique identifier for the file system (FSID) 143 that controls access to the data base container file to be protected.

A unique identifier 144 for the data base container file (CID) that is protected via the present disclosure.

Table 131 holds the following information in different columns:

A unique identifier 144 for the data base container file (CID).

A unique identifier 146 of the data block of the database container file that is observed by the data management 10. A data block may be equal to the used data base container structure entity (e.g. Extent for IBM's DB2).

An indication of the activity (RA) 148 that may be recorded for the observed data block of the data base container file. Example entries are N (No activity), R (Read activity), or W (Write activity). Each backup (full or incremental) will reset the value for RA of the affected block to N. The change tracking that happens in the meanwhile will set a data block that was accessed for READ to R and a block that was accessed for WRITE to W. However; it is not possible to set a block from value W to value R. This may ensure the correct handling of data blocks in terms of the incremental backup and restore.

In this example, it is shown that tables 130 and 131 are stored in the backup server 120. However, tables 130 and 131 may be stored in the data management system 10 and/or the backup server 120.

The file system may be data management API, DMAPI, enabled such as a general parallel file system (GPFS).

Figure 2:
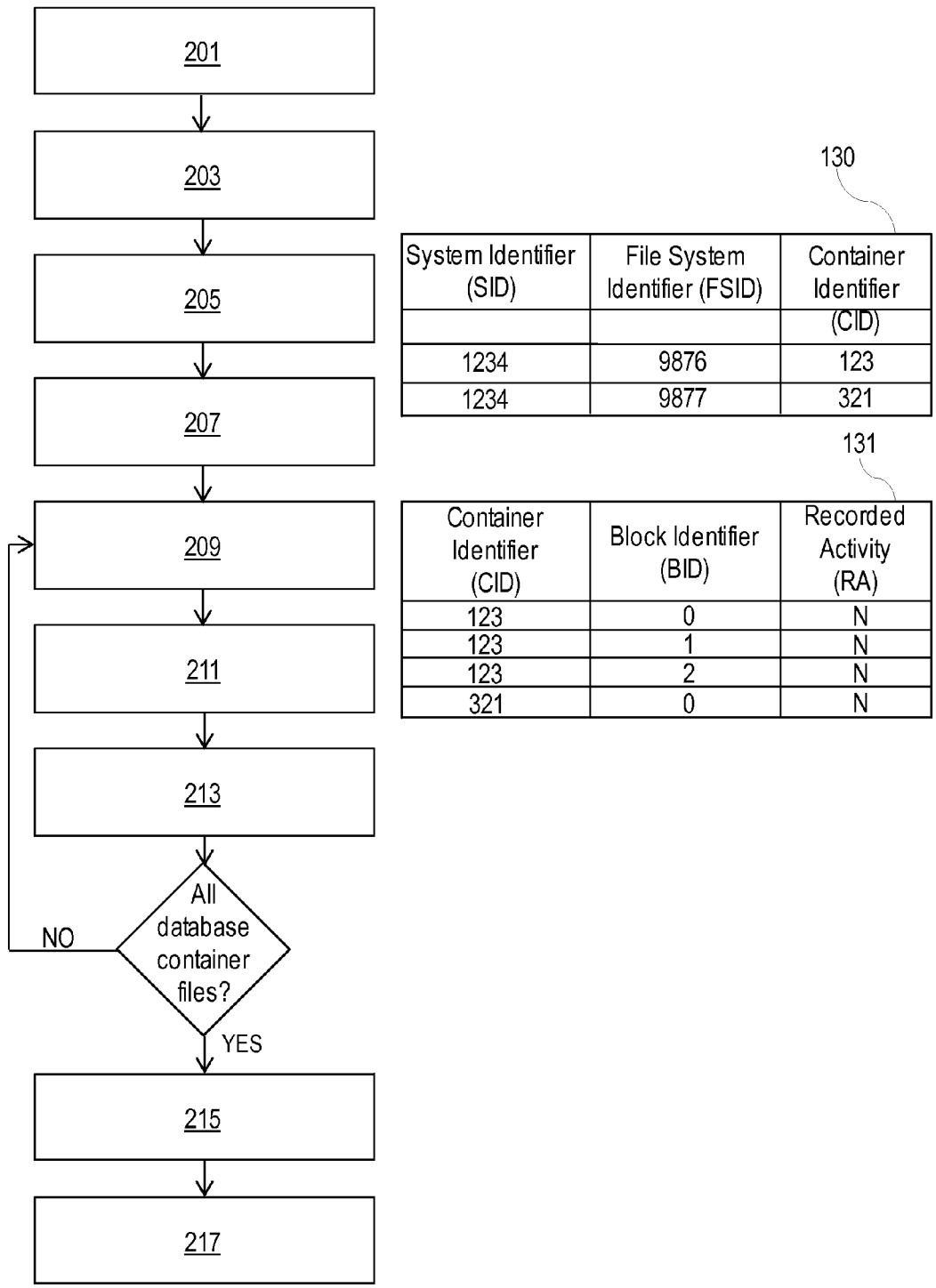
FIG. 2 is a flowchart of a method for the initial backup of the a file system that controls access to a database container file.

FIG. 2 is a flowchart of a method for the first or initial backup of the file system 101 that manages or controls access to the database container file 115. Backing up the file system 101 may comprise backing up of the database container files it manages and/or backing up of the file system itself.

In step 201, backup client 110 initiates the backup of the file system 101. This includes the initiation of the quiescence of the database application 119 to have a consistent database container state for backup. Furthermore all affected database container files may get a DMAPI mask that allows READ and WRITE tracking on the database container files on data block (extent) level.

In step 203, backup client 110 initiates the split copy of component 104. For example, the primary storage 121 may be mirrored to the secondary storage 122. From database point of view the backup operation ends now and production of the database application 119 may be restarted.

In step 205, backup client 110 contacts the backup server 120 and initiates the creation of table 130 and 131 for the given system and file system 101 to be protected.

In step 207, backup client 110 mounts the secondary storage 122 of the storage component or device 104 on compute node 112 for offload backup. This includes the creation of an entry for the system and file system 101 in table T1 130 at the backup server 120.

After that, backup client 110 performs the following method for offloading the backup.

In step 209, backup client 110 accesses database container file 115 for offload.

In step 211, backup client traverses the database container file 115 and creates an entry for each data block (extent) of the database container file 115 in table 131 at the backup server 120.

In step 213, backup client 110 sends the complete data base container file 115 to backup server 120, thereby a first or initial version of the database container file 115 is created.

Steps 209-213 may be repeated for all database container files to be protected in the data management system 10.

In step 215, backup client 110 collects a metadata image of the file system 101 and sends it to backup server 120 for backup.

In step 217, backup server 120 may have access to several objects of the database container file (e.g. one object per data block of the database container file) to allow data block (extent) based handling for the incremental backup. For that, the backup server 120 may use a so-called function partial file access. For example, in the case a data block of the database container file was accessed on client side and has to be restored the backup client 110 may get the "offset" and "length" of the accessed data block from the DMAPI. The backup client 110 may request the backup server 120 to send the data blocks with the "offset" and "length" for the given database container file. Furthermore it stores the metadata of the database container file 115 for single data base container files restore.

After the initial full back up, the tables 130, 131 are filled as described below.

The computer system or compute node with id 1234 has two protected file systems. These are the file systems with id's 9876 and 9877. File system e.g. 101 with id 9876 manages data base container file 115 with id 123. Another file system (not shown) with id 9877 manages another database container file with id 321. Database container file with id 123 contains three data blocks. These three blocks have the block id's 0, 1, and 3. Data base container file with id 321 contains one data block. This data block has the block id 0. All records are new. Therefore no (N) record activity such as read or write access was observed so far.

Figure 3:
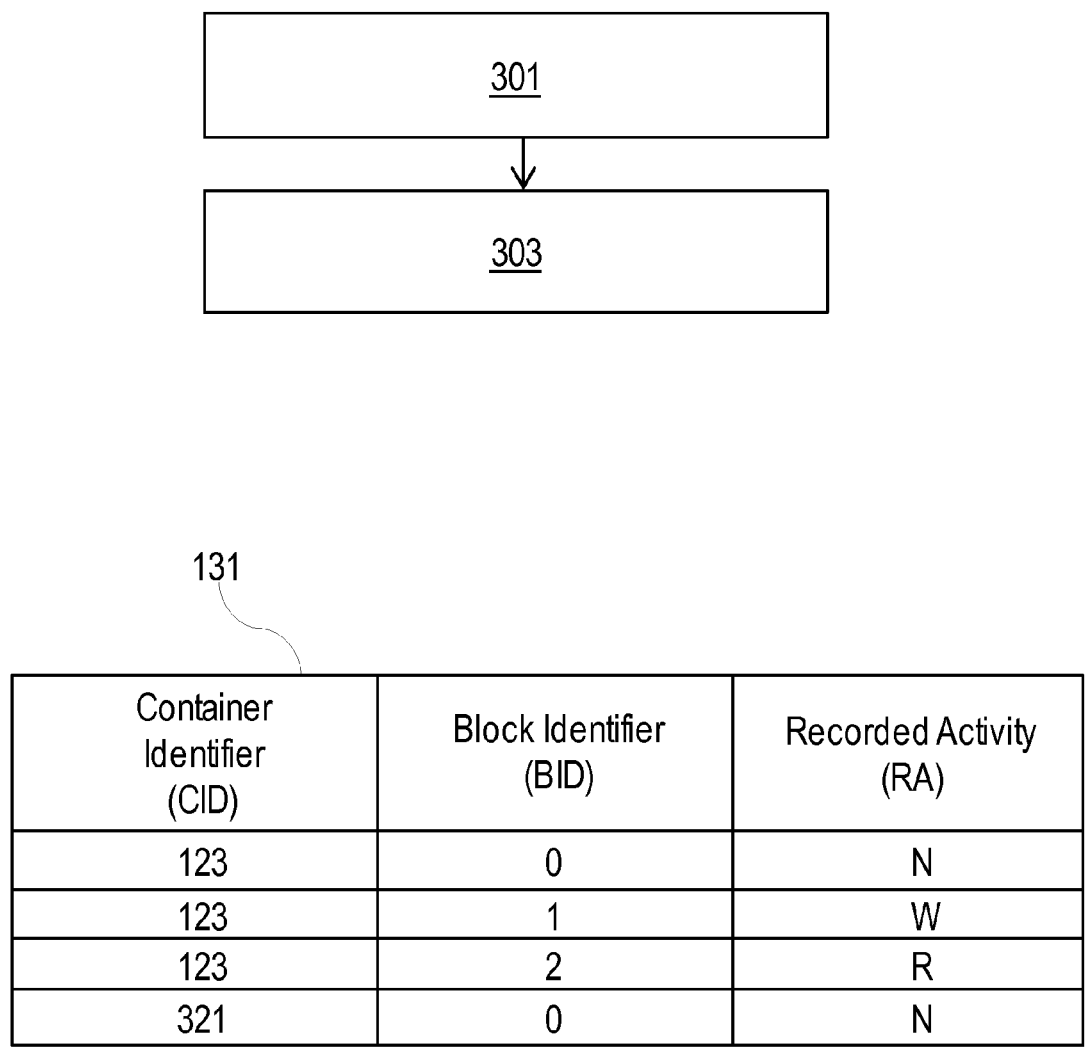
FIG. 3 is a flowchart of a method for tracking changes in a database container file.

FIG. 3 is a flowchart of a method for tracking changes in a database container file e.g. 115.

In step 301, the backup client 110 detects an access of the database application to a data block of the database container file 115. The access to the data block may be a read or a write access. In order to detect the access the backup client 110 may intercept access attempts by the database application 119 to the data block e.g. using a Journaling function of the file system or by configuring the database application to inform the backup client of the access attempts.

In another example, a DMAPI event mask may be set on the database container file 115 such that events are created by DMAPI implementation for each access attempt to the database container file 115 and are sent to the backup client 110. These events can have the types READ or WRITE on a granularity on data block (or extent) level and indicate whether a data block (extent) was accessed for READ or WRITE from the database application. In this case, the backup client 110 may receive information from the DMAPI implementation about the event type (READ or WRITE) and the block (extent) id 146 of the affected data block (extent). Furthermore the id 144 of the data base container file 115 is part of the event in the received information.

In step 303, the backup client 110 sends an update for table 131 to backup server 120, and requests that the backup server 120 updates table 131 with the received information. This is in case the tables 130, 131 are initially created as explained above with reference to FIG. 2. However, in an alternative example, the backup client 110 may send a request to newly create the tables 130 and 131 as soon as the first access to the database container file 115 is detected. The first access may occur at a first time after an initial version of the database container file is saved in the backup server 120.

For example, after a given time period, tables 131 and 130 are filled or updated as described below.

The backup server 120 received two change tracking updates from backup client 110. The first request was for database container file with id 123. Block with id 1 was accessed for WRITE. The second request was for database container file with id 123. Block with id 2 was accessed for READ. The other data blocks with ids 0 have been not accessed and thus have value N. These other data blocks may not be present in the table 131 in case the table 131 is created with the alternative method i.e. as soon as the first access is detected.

Figure 4:
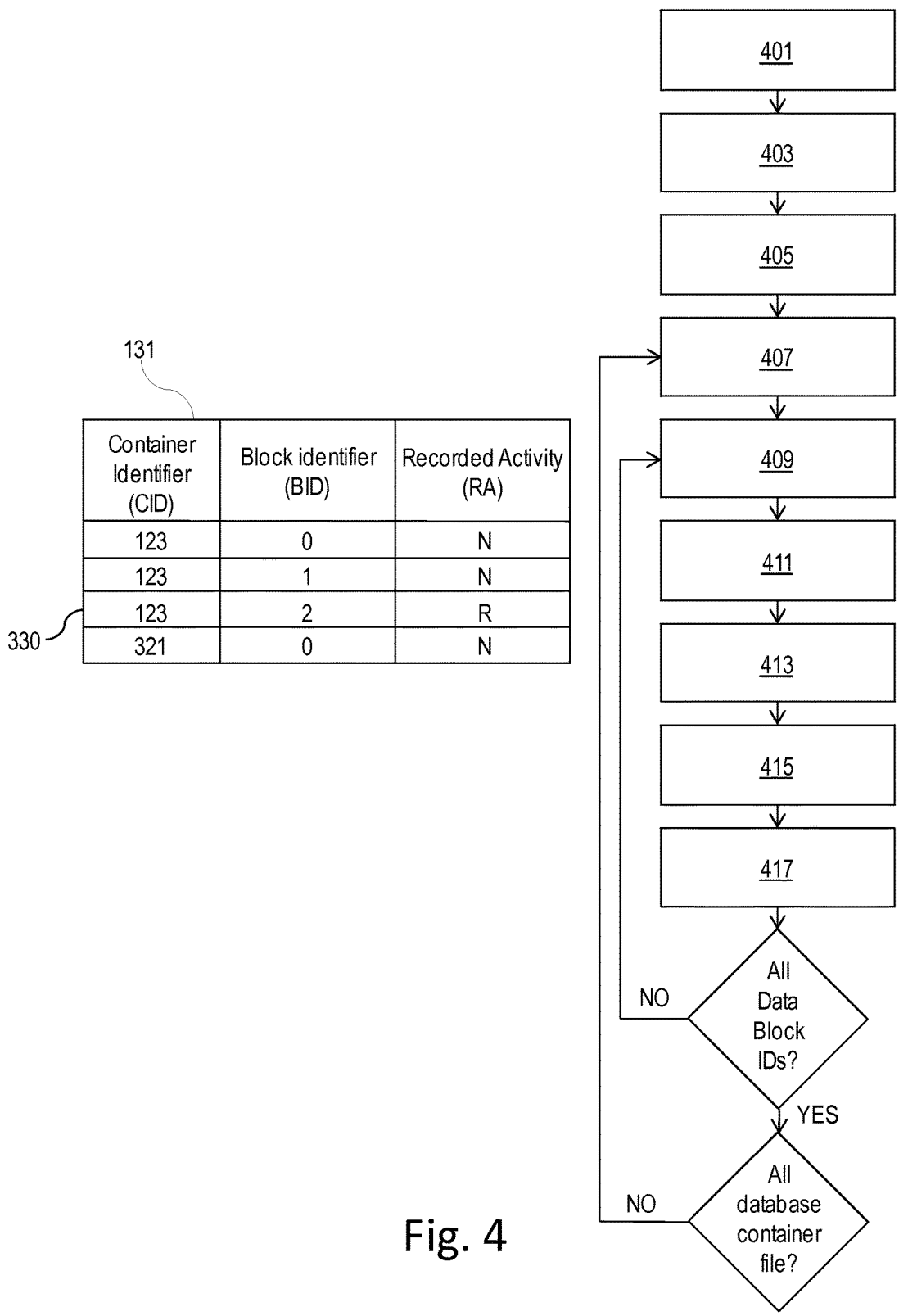
FIG. 4 is a flowchart of a method for an incremental backup of the file system.

FIG. 4 is a flowchart of a method for an incremental backup of the file system 101 controlling access to the database container file 115.

In step 401, the backup client 110 initiates the backup of the file system 101 (e.g. of the database container file 115). This includes the initiation of the quiescence of the database application 119 to have a consistent database container file state for backup.

In step 403, backup client 110 initiates the split copy of component 104. The primary storage 121 may be mirrored to the secondary storage 122. From database point of view the backup operation ends now and production of the database application 119 may be restarted.

In step 405, backup client 110 mounts the secondary storage 122 on compute node 112 for offload backup.

After step 405, backup client 110 performs the incremental offload backup as described below.

In step 407, backup client 110 accesses data base container file 115 for offload.

In step 409, backup client 110 contacts backup server 120 and opens table 131 for a query for data blocks with value W in column RA 148. This step 309 may not be needed when the tables are locally stored in the data management system 10.

In step 411, backup client 110 receives the id 146 of a data block with value W in column 148.

In step 413, backup client 110 traverses the data base container file 115 and locates the data block with the id 146 that was received from backup server 120. For example, the DMAPI implementation may be used for the traversal of the database container file 115 at the data block level.

In step 415, backup client 110 sends the data block having the received id 146 to backup server 620.

In step 417, backup server 120 resets for the given data block id the value of column 148 to N e.g. as a dummy value.

Steps 409-417 may be repeated for all data blocks id 146 received from backup server 120.

Steps 407-419 may be repeated for all database container files to be protected.

In addition, the backup client 110 may collect a metadata image of the file system 101 and send it to backup server 120 for backup.

After the incremental backup, the table 131 is updated.

After the change block tracking update in FIG. 3 above the value of column 148 for data block with block id 1 in data base container file with id 123 was set to W. This indicates that the data block has to be considered for incremental backup. The query on the table initiated from 110 has returned this entry and the data block was backed up. After the backup of the data block, the entry for the data block was reset to N. The incremental backup has no impact to the table row 330 123-2-R. Only written (means changed) data blocks may be considered for backup.

Figure 5:
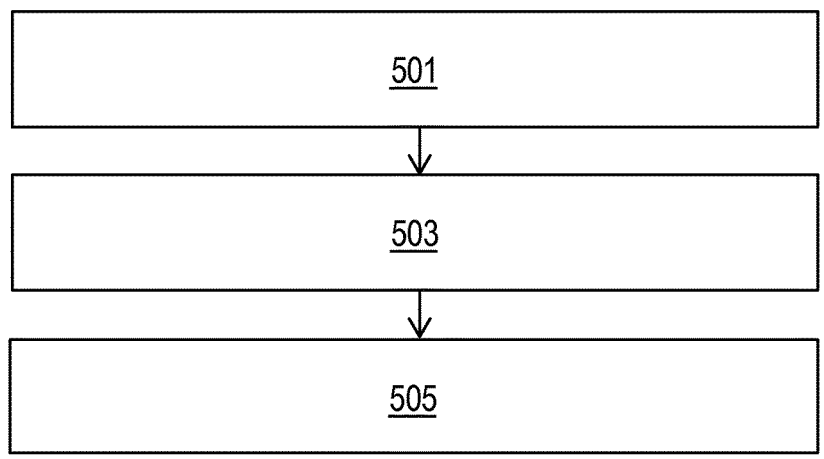
FIG. 5 is a flowchart of a method to restore a single database container file.

FIG. 5 is a flowchart of a method to restore a single database container file e.g. 115.

In step 501, backup client 110 queries (e.g. upon receiving a restore request) backup server 120 for the metadata of the required data base container file.

In step 503, backup client 110 uses the metadata information received from backup server 120 to recreate the required data base container file in the file system 101. The recreation consists of a creation of the inode information of the database container file. In case the file system is DMAPI enabled the DMAPI mask of the database container file may be recreated as well. After this operation has finished the database application 119 starts production. Due to the DMAPI mask implementation the data block (extent) that was accessed from the database application 119 inside the database container file 115 may be restored on demand from the backup client 110 as the backup client 110 may receive a request in the form of a read event from the DMAPI implementation.

In step 505, backup client 110 queries table 131 on backup server 120 for all entries that have the W or R indication in column 148. It can be foreseen that these data blocks (accessed recently) may be accessed in the near future also. For each block id received from the backup server 120 the backup client 110 restores the required data block to the data management system 10. After the data block was restored the value for column 148 will be reset to N. This allows the adoption of the change tracking the potential new access sequences after the restore.

After restore of FIG. 5, the table 131 was updated.

The backup client 110 performed the restore of the database container file with id 123. The query of table 131 has shown that entry for database container file with id 123 and data block with id 2 had the value R in column 148 before the restore. This data block was restored and the value for RA 148 was reset to N.

Figure 6:
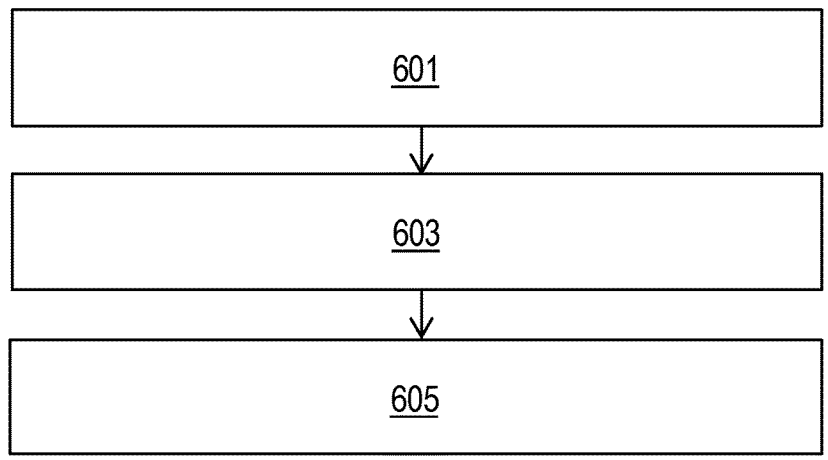
FIG. 6 is a flowchart of a method for a disaster recovery of a full file system.

FIG. 6 is a flowchart of a method for a disaster recovery of a full file system.

In step 601, backup client 110 queries the backup server 120 for the metadata image of the file system to be recovered e.g. in case a disaster occurs that partially or completely delete content of the data management system 10.

In step 603, backup client 110 uses the metadata information received from backup server 120 to recreate the file system 101 including the complete directory tree and all hosted database container files controlled by the file system 101. The recreation consists of a creation of the inode information of all the database container files. In case the file system 101 is DMAPI enabled, the DMAPI mask of the database container file 115 may be recreated. After this operation has finished the database application 119 starts production. Due to the DMAPI mask implementation the data block (extent) that was accessed from the database application 119 inside the database container file 115 may be restored on demand from the backup client 110.

In step 605, backup client 110 queries table 131 on backup server 120 for all entries that have the values W or R in the RA column 148. It can be foreseen that these data blocks (accessed recently) may be accessed in the near future also. For each block id received from the backup server 120 the backup client 110 restores the required block to the data management system 10. After the data block was restored the value for column RA 148 will be reset to N. This allows the adaption of the change tracking the potential new access sequences after the restore.

After the disaster recovery the table 131 was updated.

The backup client 110 performed the disaster recovery of the full file system including all database container files. The query of table T2 131 has shown that entry for database container file with id 123 and data block with id 2 had the value R in column RA 148 before the restore. This block was restored and the value for RA was reset to N.

Figure 7:
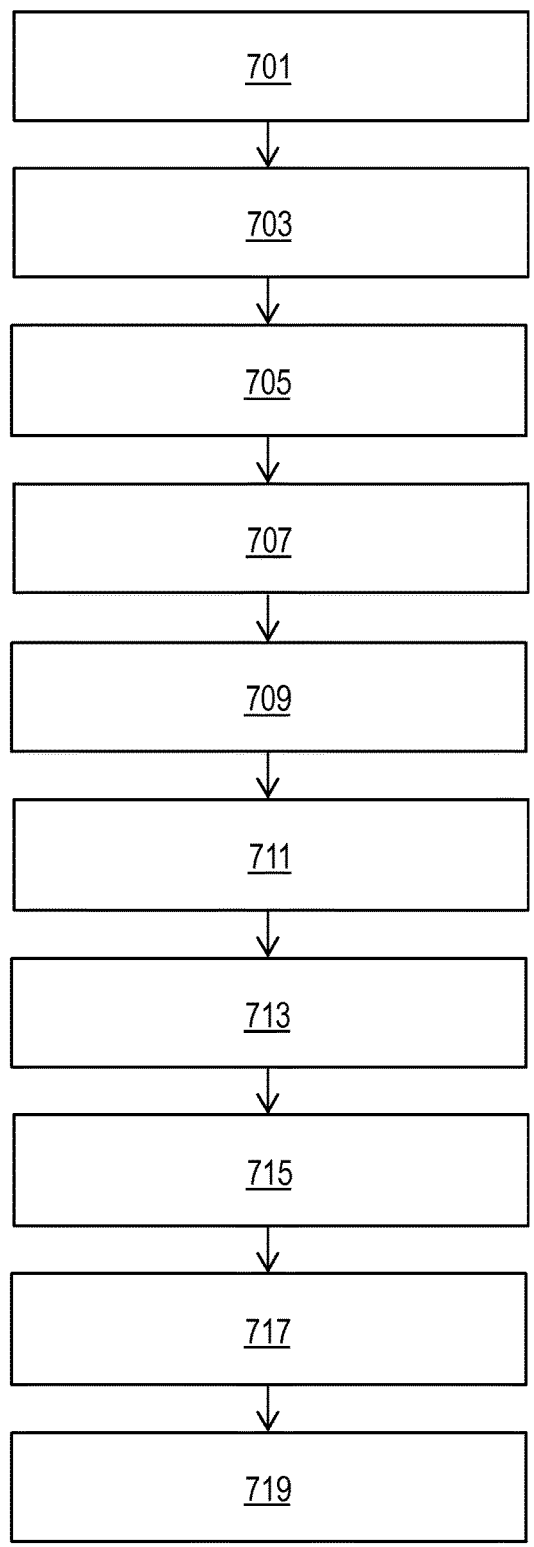
FIG. 7 is a flowchart of a data block based backup method in the data management system.

FIG. 7 is a flowchart of a data block based backup method for the data management system 10.

For example, the backup server 120 stores a first version of the database container file 115. And a first inode comprising information on data blocks of the first version of the database container file is stored in the backup server 120 and/or in the data management system 10. The first version of the database container file 115 may be created as described with reference to FIG. 2.

In step 701, a change tracking table may be created for at least the database container file 115 e.g., tables 131 and 130. The tables 130 and 131 may be filed as described above such that an entry is added in the change tracking table 130, 131 in response to detecting an access of the database application 119 to a data block of the database container file 115. The entry comprises an indication of the respective data block in association with an information indicating the type of the access e.g., a read and a write access.

In another example, the change tracking table 130, 131 may comprise an entry for each data block of the database container file 115 even if it is not accessed after the first version of the database container file 115 is created. In this case, the change tracking table 130, 131 may be created at the time or after the first version of the database container file 115 is created.

In step 703, a request to backup the database container file 115 may be received e.g. by the backup client 110.

In step 705, in response to the request the backup client 110 may pause or suspend the execution of the database application 119. The pausing step comprises storing information indicative of a state of the execution unit (that runs the database application 119) of the data management system 10 at a time of the pausing.

In step 707, in response to the request the backup client 110 may perform a snapshot of a storage volume containing at least the file system 101 and the database container file 115 in a second storage 122 of the data management system 10.

In step 709, the execution of the database application may be restarted or resumed. The resuming or restarting comprises restoring the state of the execution unit based on the information stored.

In step 711, the snapshot storage volume is mounted such that, in step 713, the file system 101 including a copy of the database container file may be recreated in the second storage 122.

In step 715, entries in the change tracking table 131 referencing the database container file 115 and that are associated with information indicating a write access may be identified. For example, in case the change tracking table 131 is stored in the backup server 120, the backup client 110 may connect to the backup server 120 and queries the change tracking table 130, 131.

In step 717, the data associated with data blocks of the identified entries may be copied to the backup server 120 from the copy of the database container file. This may result in a second version of the database container file 115.

In step 719, the first inode for indicating the backed up data blocks in the backup server 120 may be updated to obtain a second inode associated with the second version of the database container file.

Figure 8:
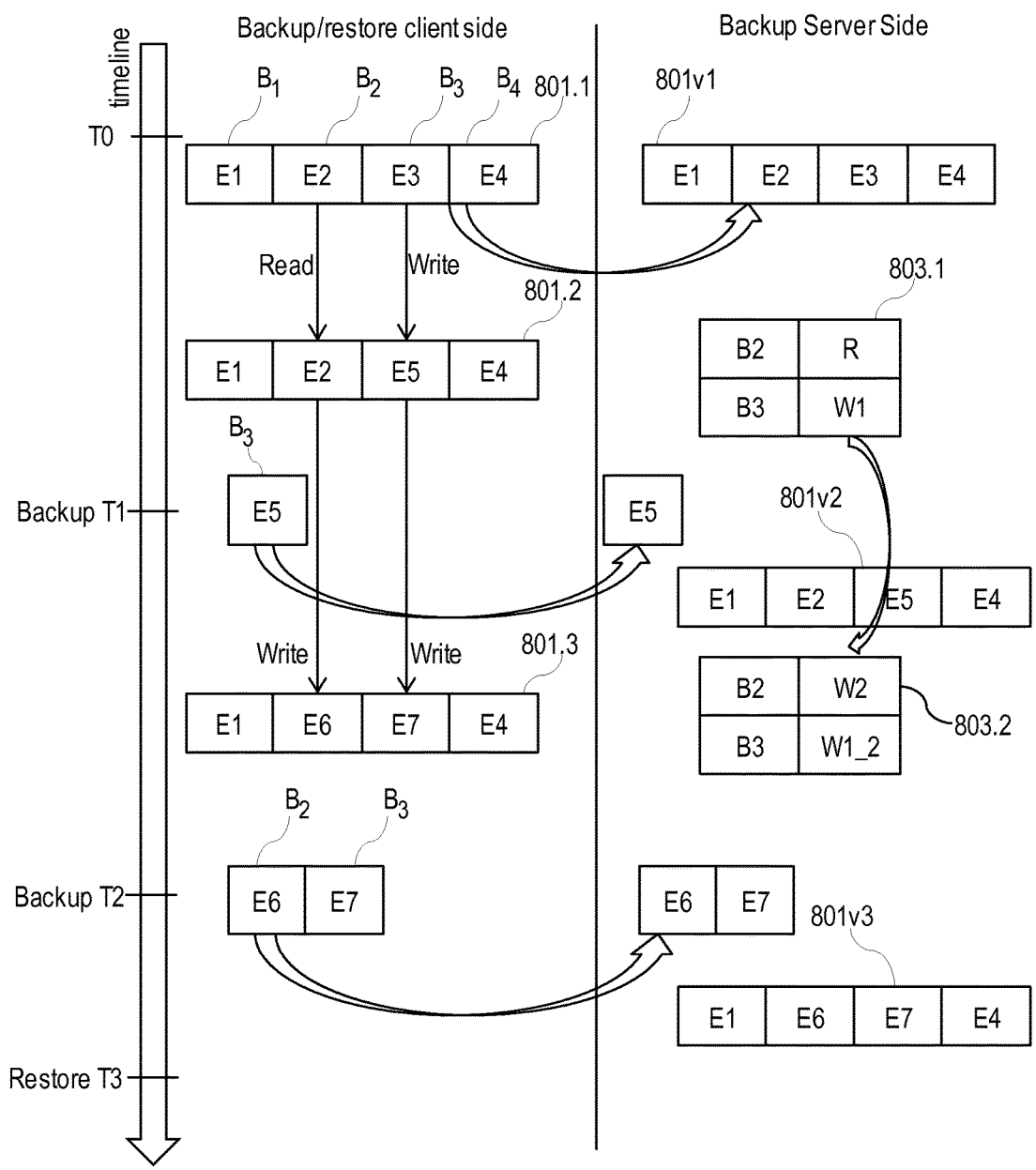
FIG. 8 is a diagram illustrating steps in backup and restores of data.

FIG. 8 illustrates a simplified diagram for a data block backup and restore method.

For example, at time T0, the data management system 10 may comprise a database container file 801.1. The database container file 801.1 may comprise data blocks B1-B4, having data content or values E1-E4 respectively. An initial copy of the database container file 801.1 is also stored in the backup server 120 side. This initial copy of the database container file 801.1 may, for example, be provided using the method described in FIG. 2. In another example, a copy of the database container file 801 may be performed to the backup server 120 at time T0. Thus, at time T0 a first version 801v1 of the database container file 801.1 is saved in the backup server 120. In this case, a first inode comprises information on data blocks B1-B4 e.g. where they are stored on the backup server 120 side is provided or generated. The first inode may be stored in the data management system and/or backup server 120.

After that time T0 and before a time T1 at which a first backup of the database container file may be received/requested, the data blocks B2 and B3 of database container file 801.1 have been accessed. Data block B2 has been accessed for read and data block B3 has been accessed for write such that its content becomes E5 instead of E3. As soon as a first one of these accesses happened a change tracking table 803.1 (having structure similar to table 130-131 described above) may be created such that it comprises two entries. In this example, the table 803.1 is shown as contained in the backup server side but it may also be on the backup client side. The first entry of table 803.1 indicates that data block B2 has been accessed for read "R" and data block B3 has been accessed for write "W1". The string "W1" is the recorded activity (e.g. 148) that indicates that the write access concerns the first version of the database container file 801.1 since it has an index "1" indicating the version number. A skilled person in the art may use other ways for indicating that the write access concerns a specific version e.g. adding an index (1) of the modified version or any other indication such as a link list associated with value "W" in the change tracking table where the link list comprises an ordered list of the versions they were accessed for write e.g. if version 1 is accessed for write first and version 3 is second accessed for write, the link list may indicate v1 and then v3. The database container file 801.1 becomes then database container file 801.2.

At time T1, a backup of the database container file 801.2 is to be performed (e.g. upon receiving a request or automatically). For that, the backup client 110 may read table 803.1 to identify that the data block B3 has been accessed for write such that its content becomes E5. In this case, modified data block B3 is sent to the backup server 120. As a result, at time T1 a second version of the database container file

801v2 is stored in the backup server 120 (i.e. there is no need to duplicate data blocks that has not been changed; only changed data blocks may be stored in the backup server. the data blocks belonging to the database container file 801v2 may be identified by a second inode). The second inode may be created using the first inode such that it indicates the data blocks with respective content E1, E2, E5 and E4. The difference between the second inode and the first inode is the information concerning data block B3 of database container file 801v1 and database container file 801v2. The first and second inodes may be different components or may be on the same component i.e. on a single inode that comprises content of the first and second inodes.

After time T1 and before a time T2 at which a second backup of the database container file may be received/requested, the data blocks B2 and B3 of database container file 801.2 have been accessed for write such that content of B2 becomes E6 and content of B3 becomes E7. In this case, the backup client 110 may update the change tracking table 803.1 such that record activity indicates that data block B2 has been accessed for write. The record activity "W2" (e.g. 148) indicates the write access of data block B2 of the second version of the database container file 801v2 because it has an index "2". The record activity "W1_2" of the data block B3 indicates that it has been accessed for writing twice i.e. it indicates that the write has been performed twice one on the first version i.e. index "1" and another time on the second version i.e. index "2". The indexes "1" and "2" may be written in a given order e.g. from left to the right to indicate that the most left index refers to the version that has been first or earlier accessed for change.

At time T3, a backup of the database container file 801.3 is to be performed. For that, the backup client 110 may read table 803.2 to identify that the data blocks B2 and B3 have been accessed for writing such that their contents become E6 and E7 respectively. In this case, data blocks B2 and B3 are sent to the backup server 120. As a result, at time T2 a third version of the dataset container file 801v3 is stored in the backup server 120. A third inode may then be created using the second inode such that it indicates the data block contents E1, E6, E7, and E4. The difference between the third inode and the second inode is the information concerning data blocks B2 and B3 of database container file 801v2 and database container file 801v3.

At time T4, a restore request may be received by the backup client 110. The restore request indicates the first version 801v1 of the database container file. In this case, the backup client 110 may read table 803.2 to identify which entry is associated with a write access that relates to the first version. For example, the backup client 110 may read the index "1" in the recorded activity "W1_2" to determine that the data block B3 of the first version 801v1 of the database container file has been changed. The backup client 110 may then retrieve data block B3 using the first inode. This data block B3 would most likely be used again by the database application, and the database application may not use the other data blocks B1, B2, and B4. However, if there is an access attempt to any of data blocks B1, B2, and B4 it may be retrieved from the backup server using the first inode.

For example, the backup of FIG. 8 may be performed as described above e.g. steps 705-717, including pausing of the database application, creating a snapshot etc.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire-line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. The amount of processing resources may indicate the use degree of each of the physical components such as CPU, memory, and N/W bandwidth included in the computer system and their money cost. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A data block based backup method for a data management system, the data management system comprising a file system having a database management application program interface (DMAPI), wherein the file system controls access by a database application to at least one database container file set with a DMAPI event mask and stored in a first storage of the data management system, the data management system further comprising a backup client that is connected to a remote backup server in a client-server configuration, wherein a first version of the database container file is saved in the backup server, a first inode comprising information on data blocks of the first version of the database container file, the method comprising:

creating a change tracking table for at least the database container file, and repeatedly adding an entry in the change tracking table in response to detecting an access of the database application through the DMAPI to a data block of the database container file set with the DMAPI event mask, wherein the entry comprises an indication of the respective data block in association with an information indicating the type of the access, wherein the type of the access comprises at least one of a read and a write access tracked by the DMAPI event mask;

in response to receiving a request to backup the database container file: pausing the execution of the database application and performing a snapshot of a storage volume containing at least the file system and the database container file in a second storage of the data management system;

resuming the database application;

mounting the snapshot storage volume;

recreating the file system including a copy of the database container file in the second storage using the mounted storage volume and recreating the DMAPI event mask associated with the database container file;

identifying entries in the change tracking table referencing the database container file and that are associated with information indicating a write access;

copying the data associated with data blocks of the identified entries to the backup server from the copy of the database container file, thereby backing up a second version of the database container file; and updating the first inode for indicating the backed up data blocks in the backup server, thereby obtaining a second inode.

2. The method of claim 1, further comprising:

generating a metadata image of the file system including information on the database container file; and sending the metadata image to the backup server.

3. The method of claim 2, further comprising:

detecting a disaster event in the data management system;

pausing the database application;

retrieving the metadata image of the file system and the second inode from the backup recreating the file system and an empty database container file using the metadata image; and resuming the database application, wherein in case of a read access by the database application to a given data block of the database container file, retrieving the given data block from the backup server using the second inode.

4. The method of claim 2, further comprising:
  detecting a disaster event in the data management system, wherein the disaster event induces an interruption of the execution of the database application;
  retrieving the change tracking table, the metadata image of the file system and the second inode from the backup server;
  recreating the file system and an empty database container file using the metadata image;
  retrieving data blocks associated with entries having a write and read access type of the database container file in the change tracking table; and
  resuming the database application, wherein in case of a read access by the database application to a non-retrieved data block of the database container file, retrieving that data block from the backup server using the second inode.

5. The method of claim 1, further comprising:
  receiving a request to restore the second version of the first database file container; and
  upon detecting a read access of the data base application to a data block of the current version of the database container file, using the second inode for retrieving the data block from the backup server.

6. The method of claim 1, further comprising:
  receiving a request to restore the second version of the first database file container;
  retrieving the change tracking table from the backup server;
  identifying entries of the change tracking table associated with a write access and entries associated with a read access in case the second version is not the last version;
  using the second inode for retrieving the data blocks associated with the identified entries; and
  upon detecting a read access of the data base application to a non-retrieved data block of the current version of the database container file, using the second inode for retrieving that data block from the backup server.

7. The method of claim 1, wherein an entry of the tracking change table having information indicating a write or read access is updated only if the corresponding data block is accessed for writing.

8. The method of claim 1, wherein the file system is a general parallel file system (GPFS).

9. The method of claim 1, further comprising:
  disabling the entries of the change tracking table that have been backed up by at least one of deleting said entries; and
  changing the information to indicate a dummy value for the access type.

10. The method of claim 1, wherein the change tracking table is stored in one of the data management system and the backup server.

11. A computer system for data block based backup for a data management system, the data management system comprising a file system having a database management application program interface (DMAPI), wherein the file system controls access by a database application to at least one database container file set with a DMAPI event mask and stored in a first storage of the data management system, the data management system further comprising a backup client that is connected to a remote backup server in a client-server configuration, wherein a first version of the database container file is saved in the backup server, a first inode comprising information on data blocks of the first version of the database container file, comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  creating a change tracking table for at least the database container file, and repeatedly adding an entry in the change tracking table in response to detecting an access of the database application through the DMAPI to a data block of the database container file set with the DMAPI event mask, wherein the entry comprises an indication of the respective data block in association with an information indicating the type of the access, wherein the type of the access comprises at least one of a read and a write access tracked by the DMAPI event mask;
  in response to receiving a request to backup the database container file: pausing the execution of the database application and performing a snapshot of a storage volume containing at least the file system and the database container file in a second storage of the data management system;
  resuming the database application;
  mounting the snapshot storage volume;
  recreating the file system including a copy of the database container file in the second storage using the mounted storage volume and recreating the DMAPI event mask associated with the database container file;
  identifying entries in the change tracking table referencing the database container file and that are associated with information indicating a write access;
  copying the data associated with data blocks of the identified entries to the backup server from the copy of the database container file, thereby backing up a second version of the database container file; and
  updating the first inode for indicating the backed up data blocks in the backup server, thereby obtaining a second inode.

12. The computer system of claim 11, further comprising:
  generating a metadata image of the file system including information on the database container file; and
  sending the metadata image to the backup server.

13. The computer system of claim 12, further comprising:
  detecting a disaster event in the data management system;
  pausing the database application;
  retrieving the metadata image of the file system and the second inode from the backup server;
  recreating the file system and an empty database container file using the metadata image; and
  resuming the database application, wherein in case of a read access by the database application to a given data block of the database container file, retrieving the given data block from the backup server using the second inode.

14. The computer system of claim 12, further comprising:
  detecting a disaster event in the data management system, wherein the disaster event induces an interruption of the execution of the database application;
  retrieving the change tracking table, the metadata image of the file system and the second inode from the backup server;
  recreating the file system and an empty database container file using the metadata image;

retrieving data blocks associated with entries having a write and read access type of the database container file in the change tracking table; and resuming the database application, wherein in case of a read access by the database application to a non-retrieved data block of the database container file, retrieving that data block from the backup server using the second inode.

15. The computer system of claim 11, further comprising:
receiving a request to restore the second version of the first database file container; and
upon detecting a read access of the data base application to a data block of the current version of the database container file, using the second inode for retrieving the data block from the backup server.

16. The computer system of claim 11, further comprising:
receiving a request to restore the second version of the first database file container;
retrieving the change tracking table from the backup server;
identifying entries of the change tracking table associated with a write access and entries associated with a read access in case the second version is not the last version;
using the second inode for retrieving the data blocks associated with the identified entries; and
upon detecting a read access of the data base application to a non-retrieved data block of the current version of the database container file, using the second inode for retrieving that data block from the backup server.

17. The computer system of claim 11, wherein an entry of the tracking change table having information indicating a write or read access is updated only if the corresponding data block is accessed for writing.

18. A computer program product for data block based backup for a data management system, the data management system comprising a file system having a database management application program interface (DMAPI), wherein the file system controls access by a database application to at least one database container file set with a DMAPI event mask and stored in a first storage of the data management system, the data management system further comprising a backup client that is connected to a remote backup server in a client-server configuration, wherein a first version of the database container file is saved in the backup server, a first inode comprising information on data blocks of the first version of the database container file, comprising:
one or more computer-readable storage medium and program instructions stored on at least one of the one or more tangible storage medium, the program instructions executable by a processor, the program instructions comprising:
program instructions to create a change tracking table for at least the database container file, and repeatedly adding an entry in the change tracking table in response to detecting an access of the database application through the DMAPI to a data block of the database container file set with the DMAPI event mask, wherein the entry comprises an indication of the respective data block in association with an information indicating the type of the access, wherein the type of the access comprises at least one of a read and a write access tracked by the DMAPI event mask;
program instructions to respond to receiving a request to backup the database container file: pausing the execution of the database application and performing a snapshot of a storage volume containing at least the file system and the database container file in a second storage of the data management system;
program instructions to resume the database application;
program instructions to mount the snapshot storage volume;
program instructions to recreate the file system including a copy of the database container file in the second storage using the mounted storage volume and recreate the DMAPI event mask associated with the database container file;
program instructions to identify entries in the change tracking table referencing the database container file and that are associated with information indicating a write access;
program instructions to copy the data associated with data blocks of the identified entries to the backup server from the copy of the database container file, thereby backing up a second version of the database container file; and
program instructions to update the first inode for indicating the backed up data blocks in the backup server, thereby obtaining a second inode.

19. The computer program product of claim 18, further comprising:
program instructions to generate a metadata image of the file system including information on the database container file; and
program instructions to send the metadata image to the backup server.

20. The computer program product of claim 19, further comprising:
program instructions to detect a disaster event in the data management system;
program instructions to pause the database application;
program instructions to retrieve the metadata image of the file system and the second inode from the backup server;
program instructions to recreate the file system and an empty database container file using the metadata image; and
program instructions to resume the database application, wherein in case of a read access by the database application to a given data block of the database container file, retrieving the given data block from the backup server using the second inode.

* * * * *